(12) United States Patent
Nagy et al.

(10) Patent No.: US 7,723,451 B2
(45) Date of Patent: May 25, 2010

(54) OLEFIN POLYMERIZATION PROCESS

(75) Inventors: Sandor Nagy, Naperville, IL (US);
Barbara M. Tsuie, Cincinnati, OH (US); Bradley P. Etherton, Cincinnati, OH (US); Jean A. Merrick-Mack, West Chester, OH (US); Everett O. Lewis, Lake Jackson, TX (US); Mark P. Mack, West Chester, OH (US); Natalia Nagy, Naperville, IL (US); Edward S. Vargas, Loveland, OH (US)

(73) Assignee: Equistar Chemicals, LP, Houston, TX (US)

( * ) Notice: Subject to any disclaimer, the term of this patent is extended or adjusted under 35 U.S.C. 154(b) by 511 days.

(21) Appl. No.: 11/899,113

(22) Filed: Sep. 4, 2007

(65) Prior Publication Data

US 2009/0062490 A1   Mar. 5, 2009

(51) Int. Cl.
*C08F 4/64* (2006.01)
*C08F 4/642* (2006.01)
*C08F 4/6592* (2006.01)
*B01J 31/22* (2006.01)

(52) U.S. Cl. .............. 526/160; 526/161; 526/170; 526/172; 526/348; 526/943; 526/131; 502/103; 502/152; 502/155

(58) Field of Classification Search ........... 526/131, 526/160, 161, 170, 172, 348, 943; 502/103, 502/152, 155
See application file for complete search history.

(56) References Cited

U.S. PATENT DOCUMENTS

| | | | |
|---|---|---|---|
| 5,153,157 A | 10/1992 | Hlatky et al. | |
| 5,198,401 A | 3/1993 | Turner et al. | |
| 5,241,025 A | 8/1993 | Hlatky et al. | |
| 5,414,180 A | 5/1995 | Geerts et al. | |
| 5,648,440 A | 7/1997 | Sugano et al. | |
| 6,211,311 B1 | 4/2001 | Wang et al. | |
| 6,232,260 B1 | 5/2001 | Nagy et al. | |
| 6,451,724 B1 | 9/2002 | Nifant'ev et al. | |
| 6,559,251 B1 | 5/2003 | Mack et al. | |
| 6,908,972 B2 | 6/2005 | Tsuie et al. | |
| 6,995,216 B2 | 2/2006 | Winslow et al. | |
| 6,998,451 B2* | 2/2006 | Nagy et al. | 526/161 |
| 7,196,147 B2 | 3/2007 | Wang et al. | |
| 2005/0010004 A1* | 1/2005 | Wang | 526/127 |

FOREIGN PATENT DOCUMENTS

WO   WO 2005/005499   *   1/2005

* cited by examiner

*Primary Examiner*—Caixia Lu
(74) *Attorney, Agent, or Firm*—Jonathan L. Schuchardt; John Tyrell

(57) ABSTRACT

A slurry process for polymerizing ethylene is disclosed. The process comprises polymerizing ethylene in the presence of an α-olefin, hydrogen, and a catalyst comprising an activator and a supported, dimethylsilyl-bridged bis(indenoindolyl) zirconium complex. The process has high catalyst activity and produces polyethylene having a broad molecular weight distribution.

14 Claims, No Drawings

OLEFIN POLYMERIZATION PROCESS

FIELD OF THE INVENTION

This invention relates to a slurry process for making ethylene copolymers. The process uses a highly active catalyst and provides polyethylene with broad molecular weight distribution.

BACKGROUND OF THE INVENTION

Many olefin polymerization catalysts are known, including conventional Ziegler-Natta catalysts. While these catalysts are inexpensive and can provide a broad molecular weight distribution, they exhibit low activity and are generally poor at incorporating α-olefin comonomers. The large variety of active sites in Ziegler-Natta catalysts makes it difficult to control polymer architecture. To improve polymer properties, single-site catalysts, in particular metallocenes are beginning to replace Ziegler-Natta catalysts. Often, single site catalysts provide polyethylene with narrow molecular weight distribution.

Slurry reactors are in widespread use for production of polyethylene homo- and copolymers. Slurry reactors include stirred-tank reactors and water-jacketed tubular reactors arranged in a series of continuous horizontal or vertical loops. A "slurry solvent" in which polyethylene has low solubility constitutes the continuous phase in such reactors. The slurry is intensely stirred in a continuous stirred-tank reactor or series of reactors or, in the case of slurry loop reactors, is driven around the loop at relatively high speed by one or more rather massive pumps. Ethylene, supported catalyst, comonomers, and processing additives are injected into the reactor where polymerization takes place, creating a slurry of polyethylene in solvent.

U.S. Pat. Nos. 6,232,260 and 6,451,724 disclose the use of transition metal catalysts based upon indenoindolyl ligands. Indenoindolyl catalysts are remarkably versatile because substituent effects and bridging changes can often be exploited to provide polymers with tailored physical or mechanical properties. Unbridged indenoindolyl complexes (as exemplified in the '260 patent) usually provide favorable activity although they sometimes fail to provide polymers having high enough molecular weights. Bridged indenoindolyl complexes (as taught, e.g., in U.S. Pat. No. 6,908,972) readily copolymerize α-olefins and provide polymers with low densities. In the '972 patent, several bridged complexes are exemplified in a slurry process and the molecular weight distribution ranges from 2.66 to 7.20. U.S. Pat. No. 6,995,216 uses a silica-supported dimethylsilyl-bridged indenoindolyl complex with hydrogen and 1-butene in a two-stage slurry ethylene polymerization process. The molecular weight distribution is 3.7.

Despite the considerable experience with single-site catalysts generally and indenoindolyl catalysts in particular, there is a need for improvement. Many single-site catalysts produce polyethylene with narrow molecular weight distribution. For many applications, a broad molecular weight distribution is often required. One solution to this has been the use of mixed catalysts or blending of polyethylenes of two different molecular weight distributions. While these techniques provide broad molecular weight distribution, they increase process complexity and cost. Some catalysts, such as Ziegler-Natta catalysts, provide broad molecular weight distribution, but they have lower activity and poor comonomer incorporation. Catalyst activity is important because at low activity, the cost increases as does the potential for undesirable effects of the residual catalyst in the final polyethylene. Generally, when one needs broad molecular weight distribution, a compromise is made. A valuable process would enable high activity, broad molecular weight distribution, and preferably good comonomer incorporation from a single catalyst.

SUMMARY OF THE INVENTION

The invention is a low-temperature slurry process for polymerizing ethylene in the presence of a $C_3$-$C_{10}$ α-olefin, hydrogen, and a supported, dimethylsilyl-bridged bis(indenoindolyl) zirconium complex. The process provides polyethylene with broad molecular weight distribution, as indicated by a $M_w/M_n$ greater than 12. The catalyst used in the process has an activity ratio as defined herein greater than 4.

DETAILED DESCRIPTION OF THE INVENTION

The invention is a slurry process for polymerizing ethylene in the presence of a $C_3$-$C_{10}$ α-olefin and hydrogen. Suitable $C_3$-$C_{10}$ α-olefins include propylene, 1-butene, 1-hexene, 1-octene, and mixtures thereof. Preferred $C_3$-$C_{10}$ α-olefins are 1-butene, 1-hexene, and 1-octene. The polymerization is performed within the range of 40° C. to 90° C., more preferably from 50° C. to 85° C.

The slurry polymerization is performed in the presence of a catalyst comprising an activator and a supported complex. Complexes useful for process of the invention are dimethylsilyl-bridged bis(indenoindolyl) zirconium complexes. Suitable complexes have a structure selected from the group consisting of:

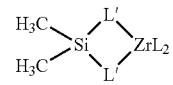

wherein each L' is an indenoindolyl ligand and each L is independently selected from the group consisting of halide, alkoxy, aryloxy, siloxy, alkylamino, and $C_1$-$C_{30}$ hydrocarbyl. Preferably, each L is Cl.

As those skilled in the art will appreciate, the complexes shown above might be prepared as a single stereoisomer or as a mixture of stereoisomers. Throughout this patent application, a given structure is meant to encompass all possible stereoisomers of that complex, alone or in combination, and no structure is intended to be limited to any one particular stereoisomer.

Preferably, the complex has a structure selected from the group consisting of:

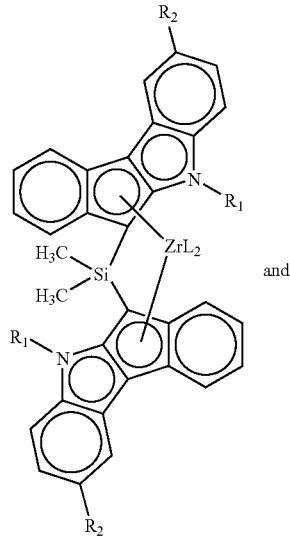

and

-continued

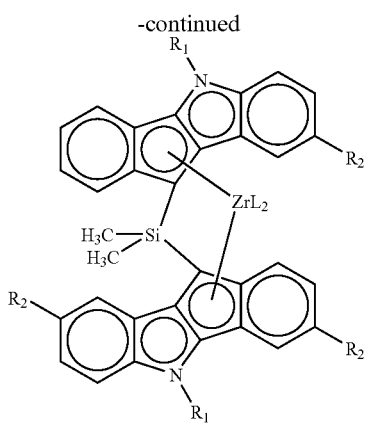

wherein each $R_1$ is independently selected from the group consisting of $C_1$-$C_{10}$ hydrocarbyl; each $R_2$ is independently selected from the group consisting of H, F, and $C_1$-$C_{10}$ hydrocarbyl; and each L is independently selected from the group consisting of halide, alkoxy, aryloxy, siloxy, alkylamino, and $C_1$-$C_{30}$ hydrocarbyl. Preferably, $R_2$ is methyl. More preferably, $R_2$ is methyl and $R_1$ is methyl or phenyl.

Indenoindolyl ligands are conveniently generated by deprotonating an indenoindole compound using a potent base. Suitable indenoindolyl ligands and ways to name, synthesize, and incorporate them into a dimethylsilyl-bridged zirconium complex have been described in considerable detail elsewhere; see, for example, U.S. Pat. Nos. 6,232,260, 6,908,972 and 6,559,251, the teachings of which are incorporated herein by reference, and the references cited therein.

Example 1 of U.S. Pat. No. 6,908,972 illustrates a particularly useful way to prepare complexes suitable for use in the inventive process. Usually, the indenoindole precursor having the desired substituents is prepared by reacting the appropriate 1-indanone and arylhydrazine precursors. The indole nitrogen can then be alkylated. Deprotonation followed by reaction with dichlorodimethylsilane conveniently attaches silicon at the indenyl methylene. Reaction of the monochlorosilane with a cyclopentadienyl, as in the '972 patent, or indenoindolyl anion, to make complexes suitable for the inventive process, provides the desired bridged ligand precursor. Double deprotonation and combination of the resulting dianion with a zirconium source affords the ultimate target, a dimethylsilyl-bridged indeno[1,2-b]indolyl zirconium complex.

An activator is used in the polymerization. The activator helps to ionize the zirconium complex and activate the catalyst. Suitable activators are well known in the art. Examples include alumoxanes (methyl alumoxane (MAO), PMAO, ethyl alumoxane, diisobutyl alumoxane), alkylaluminum compounds (triethylaluminum, diethylaluminum chloride, trimethylaluminum, triisobutylaluminum), and the like. Suitable activators include salts that contain non-nucleophilic anions. These compounds generally consist of bulky ligands attached to boron or aluminum. Examples include lithium tetrakis(penta-fluorophenyl)borate, lithium tetrakis(pentafluorophenyl)aluminate, anilinium tetrakis(pentafluorophenyl)borate, trityl tetrakis(pentafluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl)borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference. Suitable activators also include aluminoboronates—reaction products of alkyl aluminum compounds and organoboronic acids—as described in U.S. Pat. Nos. 5,414,180 and 5,648,440, the teachings of which are incorporated herein by reference. Alumoxane activators, such as MAO, are preferred.

The optimum amount of activator needed relative to the amount of zirconium complex depends on many factors, including the nature of the complex and activator, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 10 to about 500 moles, and more preferably from about 10 to about 200 moles, of aluminum per mole of zirconium. When the activator is an organoborane or an ionic borate or aluminate, the amount used will be within the range of about 0.01 to about 5000 moles, preferably from about 0.1 to about 10 moles, of activator per mole of zirconium.

The catalyst comprises a supported zirconium complex. The support is preferably a porous material such as inorganic oxides and chlorides, and organic polymer resins. Preferred inorganic oxides include oxides of Group 2, 3, 4, 5, 13, or 14 elements. Preferred supports include silicas, aluminas, silica-aluminas, magnesias, titanias, zirconias, magnesium chloride, and crosslinked polystyrene. Most preferred is silica. The silica is preferably treated thermally, chemically, or both prior to use to reduce the concentration of surface hydroxyl groups. Thermal treatment consists of heating (or "calcining") the silica in a dry atmosphere at elevated temperature, preferably greater than about 100° C., and more preferably from about 150 to about 600° C., prior to use. A variety of different chemical treatments can be used, including reaction with organo-aluminum, -magnesium, -silicon, or -boron compounds. See, for example, the techniques described in U.S. Pat. No. 6,211,311, the teachings of which are incorporated herein by reference. The amount of complex added is preferably from 0.01 to 0.5 mmol per gram of support.

In one suitable catalyst preparation method, a solution of the complex is combined with the support. The mixture is stirred in an inert atmosphere at a temperature within the range of 0° C. to 120° C., more preferably from 20° C. to 40° C. The optimum stirring time will vary somewhat, depending upon the amounts of solvent and support, but it should be long enough to ensure good mixing. Preferably, the stirring time is from 2 to 60 minutes. Stirring longer than 60 minutes should not decrease activity, but it is unnecessary. Stirring 30 minutes at room temperature is convenient and gives good results. If a large amount of solvent is used, the mixture is a slurry and it is convenient to remove some of the solvent to prepare a free-flowing solid. This can be done at room temperature by applying a vacuum. Alternatively, an incipient wetness technique can be used in which a small amount of solvent is used to dissolve the complex and the solution is added to the support material. The mixture remains a free-flowing solid without solvent removal. The mixture can be used as is or residual solvent may be removed.

Different methods for addition of the activator and for combining the complex with the support may be used. In one suitable method, the activator is premixed with the support and the complex is added to the mixture of support and activator. Optionally, the activator is combined with the complex and the mixture of activator and complex is added to the support. Alternatively, a portion of the activator is combined with the support and a mixture of the complex and the remaining amount of the activator is added to the support.

The slurry process polymerizes ethylene in the presence of a $C_3$-$C_{10}$ α-olefin, hydrogen, and a catalyst comprising an activator and a supported complex to produce polyethylene with broad molecular weight distribution as indicated by a $M_w/M_n$ greater than 12.

Preferably, the inventive slurry process has good hydrogen sensitivity and even low levels of hydrogen reduce the molecular weight. Increased levels of hydrogen further reduce the molecular weight. The hydrogen sensitivity can be judged by comparing polymerizations with and without added hydrogen. By "good hydrogen sensitivity," we mean that introduction of 0.82 mmoles of hydrogen per 1 mole of ethylene into the liquid phase reduces the weight-average molecular weight by at least 60%.

The process uses a highly active catalyst. A convenient measure of activity is the amount of polyethylene formed per hour per gram of zirconium used. Because factors such as temperature or time can influence the measured activity, it is convenient to compare measured activities with those obtained by using a known complex under similar polymerization conditions. One such readily available complex is bis(cyclopentadienyl)zirconium dichloride.

As defined herein, "activity ratio" means the value of $A_1/A_2$, where $A_1$ is the activity (grams of polymer per gram of Zr per hour) of a complex of interest that is supported and activated as described in Example 1 and is then used for a slurry polymerization in the presence of 1-butene and hydrogen as described in Example 1; and $A_2$ is the activity of bis(cyclopentadienyl)zirconium dichloride that is supported and activated as described in Example 1 and is then used for a slurry polymerization as described in Example 1 except that 1-butene and hydrogen are omitted from the slurry polymerization.

Thus, the baseline experiment with $Cp_2ZrCl_2$ is an ethylene homopolymerization performed in the absence of hydrogen. Catalysts useful in the slurry process of the invention have an activity ratio as defined herein greater than 4, preferably greater than 5.

Preferably, the slurry process produces polyethylene with good incorporation of the α-olefin. The amount of α-olefin incorporation will depend upon the particular α-olefin and the amount added to the polymerization. The level of α-olefin incorporation can be easily measured by FT-IR spectroscopy. Each molecule of α-olefin incorporated gives one tertiary carbon atom. "Good incorporation" of the α-olefin is indicated by a polyethylene density value that drops steadily upon increasing the content of α-olefin in the reaction mixture. More quantitatively, this generally means that when 63 mmoles of 1-butene per mole of ethylene is introduced into the liquid phase, the resulting polyethylene has more than 5 tertiary carbons per 1000 carbons.

Preferably, the inventive slurry process can provide polyethylene having a weight-average molecular weight greater than 100,000. Too often, a process is unable to provide polyethylenes with high enough molecular weight (or low enough melt index), and this limits its usefulness. The inventive process can provide the desirable high molecular weight.

Complex concentrations used for the olefin polymerization depend on many factors. Preferably, however, the concentration ranges from about 0.01 micromoles zirconium per liter to about 100 micromoles per liter. Olefin partial pressures normally range from about 0.1 MPa to about 350 MPa. More preferred is the range from about 0.1 MPa to about 7 MPa. Polymerization times depend on the type of process, the complex concentration, and other factors. Generally, polymerizations are complete within several seconds to several hours.

The following examples merely illustrate the invention. Those skilled in the art will recognize many variations that are within the spirit of the invention and scope of the claims.

EXAMPLE 1

A 1-L flask equipped with a stir bar is charged with 5,8-dimethyl-5,10-dihydroindeno[1,2-b]indole (26.5 g, 114 mmol) and diethyl ether (240 mL). The flask is equipped with a straight-tip gas inlet adapter with rubber septum and a reflux condenser. The mixture is cooled to 0° C., and n-butyllithium (75.0 mL, 1.6 M in hexanes, 120 mmol) is added by cannula. The mixture initially turns bright yellow, then clear orange when base addition is complete. After 20 minutes, a thick yellow paste forms. The mixture is warmed to room temperature and maintained under nitrogen overnight. A solution of dichlorodimethylsilane (7.0 mL, 58 mmol) in diethyl ether (120 mL) is added at room temperature. The mixture warms, and the slurry darkens. Once addition is complete, the mixture is brought to reflux for 3 hours and is then cooled to room temperature. Water (250 mL) is added, a solid separates from the organic layer, and the mixture is filtered. The solid is washed with diethyl ether (300 mL) and dried under vacuum to afford a gray solid (27.8 g, 46.9%).

A portion of the gray solid (3.56 g, 6.80 mmol) is slurried in 100 mL of diethyl ether and n-butyllithium (6.0 mL, 2.5 M in hexanes, 15.0 mmol) is added by syringe to the slurry. The mixture is maintained at room temperature overnight and the color changes from yellow to orange. Methylene chloride (approximately 30 mL) is added to zirconium tetrachloride (1.58 g, 6.79 mmol) followed by diethyl ether (approximately 50 mL) to give a slightly turbid mixture. The dianion is added and the mixture turns deep magenta and a precipitate forms. The mixture is stirred for 48 hours. The mixture is filtered and the dark purple residue is extracted with methylene chloride (approximately. 50 mL) and filtered. The filtrate is concentrated to approximately 70 mL and maintained to form a precipitate, which is filtered and dried. The NMR spectra reveals that the purple residue and the "crystallized" material are the same complex, 1,1-dimethylsilyl-bis-(5,10-dihydrido-5,8-dimethyl-indeno[1,2-b]indolyl)zirconium dichloride 1.

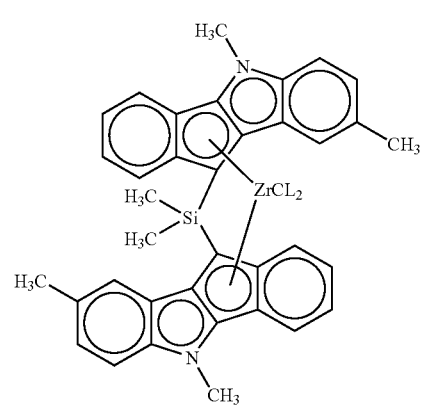

Support and Activation of Complex 1: Methylalumoxane (2.2 mL of 4.21 M solution in toluene, product of Albemarle) is added at room temperature to a slurry of 0.75 g of silica (G3, available from Fuji Silysia Chemical Ltd., calcined at 250° C. for 12 hours) in 4 mL of anhydrous toluene. The resulting stirred slurry is heated at 80° C. for two hours and cooled to ambient temperature. A 0.0926 mmole sample of dry complex 1 (Al/Zr=100) is added to the slurry and stirred for 2 hours at ambient temperature. An aliquot of this catalyst slurry is used while fresh (1 to 3 days) in polymerization tests.

Slurry Polymerization with Supported Complex 1: Isobutane (1 L), 1-butene (5 mL) and 1 M triisobutylaluminum solution in hexanes (1 mL) are added to a dry, nitrogen-purged stainless-steel stirred and jacketed autoclave reactor. The reactor is heated to 70° C. and pressurized to 1.7 MPa with ethylene. Hydrogen is added from a 7-mL vessel at 4.1 MPa to effect a pressure drop of 0.7 MPa (calculated to be 0.82 mmole hydrogen per mole of ethylene). The polymerization reaction is started by injecting an aliquot of catalyst sample. The temperature is maintained at 70° C. throughout the test. Ethylene is supplied on demand to maintain the reactor pressure of 1.7 MPa. The polymerization is terminated by venting the autoclave after consumption of around 20 g of ethylene. The polyethylene sample is dried and tested.

By GPC, the polyethylene has a weight-average molecular weight ($M_w$) of 149,000. The $M_w/M_n$ is 14.9. Branching is determined by FT-IR spectroscopy to be 5.5 tertiary carbons per 1000 carbons. The activity ratio, computed as discussed hereinabove, is 9.5. When the slurry polymerization is repeated without hydrogen and the molecular weights are compared, hydrogen reduced the $M_w$ by 86%.

EXAMPLE 2 n-Butyllithium (12.3 mL, 2.5 M in hexanes, 30.8 mmol) is added to a slurry of 2,5-dimethylindeno[2,1-b]indole (6.54 g, 28.0 mmol) in diethyl ether (100 mL). The solids dissolve, the solution darkens and the mixture is maintained at room temperature overnight. A solution of dichlorodimethylsilane (1.7 mL, 14.0 mmol) in diethyl ether (8 mL) is slowly added at 23° C. A precipitate forms. The mixture is allowed to stand overnight and is filtered through Celite. The volatiles are removed from the filtrate under vacuum. The residue is slurried in hexanes (50 mL) and filtered to give a solid (4.54 g, 31.0%).

The solid (4.54 g, 8.69 mmol) is dissolved in diethyl ether (100 mL), and n-butyllithium (7.7 mL, 2.5 M in hexanes, 19.3 mmol) is added at 23° C. to afford a clear red solution. The solution is maintained overnight and added to a solution of zirconium tetrachloride (2.02 g, 8.67 mmol) in methylene chloride (150 mL) and diethyl ether (50 mL). A dark orange solid forms. The mixture is filtered the next day, and the solid extracted with methylene chloride (100 mL) and washed with additional methylene chloride (20 mL). The filtrate is concentrated to about 80 mL, and a solid precipitates. A total yield of 0.15 g of complex 2 is isolated.

The procedures of Example 1 for supporting and activating the complex and for performing a slurry polymerization of ethylene using the supported complex are repeated using complex 2.

The resulting polyethylene has $M_w$=116,000 and $M_w/M_n$=15.4. Branching is 8.4 tertiary carbons per 1000 carbons. The activity ratio is 8.0. When the slurry polymerization is repeated without hydrogen and the molecular weights are compared, hydrogen reduced the $M_w$ by 64%.

EXAMPLE 3

A 1-L flask equipped with a stir bar is charged with 8-methyl-5-phenyl-5,10-dihydroindeno[1,2-b]indole (20.8 g, 70.4 mmol) and diethyl ether (200 mL). The flask is equipped with a straight-tip gas inlet adapter, rubber septum, and reflux condenser. A solution of n-butyllithium (32.0 mL, 2.5 M in hexanes, 80 mmol) is added. Neat dichlorodimethylsilane (4.3 mL, 35.5 mmol) is added and a precipitate forms. The mixture is stirred for three days, filtered, and volatiles removed from the filtrate to obtain an oily residue (8.87 g).

The oily residue (8.87 g, 13.7 mmol) is slurried in 180 mL of diethyl ether and n-butyllithium (12.0 mL, 2.5 M in hexanes, 30.0 mmol) is added by syringe to the slurry. The mixture is maintained at room temperature overnight and is added to a slurry of zirconium tetrachloride (3.16 g, 13.2 mmol) in methylene chloride (100 mL) and diethyl ether (50 mL) to give a dark red slurry. The mixture is stirred for 3 days. The mixture is filtered and dried to obtain a purple solid, 1,1-dimethylsilyl-bis(5,10-dihydrido-8-methyl-5-phenyl-indeno[1,2-b]indolyl) zirconium dichloride 3 (1.61 g).

The procedures of Example 1 for supporting and activating the complex and for performing a slurry polymerization of ethylene using the supported complex are repeated using complex 3.

The resulting polyethylene has $M_w$=223,000 and $M_w/M_n$=18.1. Branching is 4.3 tertiary carbons per 1000 carbons. The activity ratio is 5.4. When the slurry polymerization is repeated without hydrogen and the molecular weights are compared, hydrogen reduced the $M_w$ by 68%.

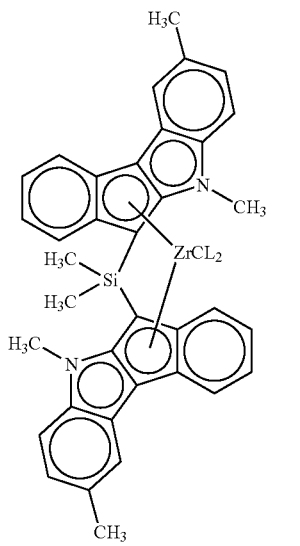

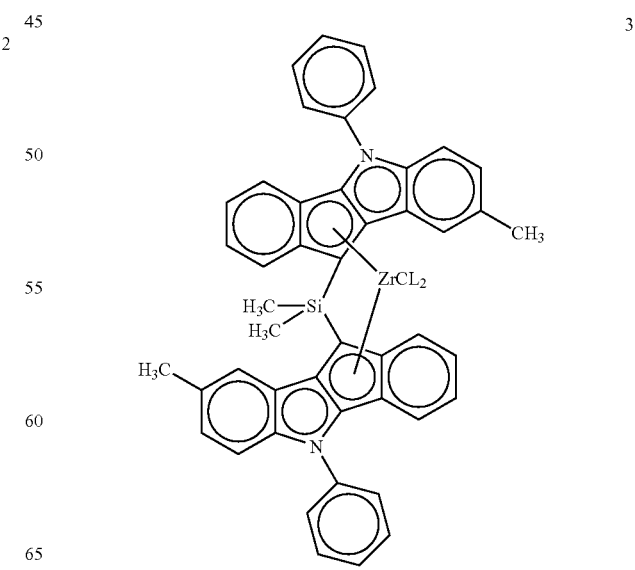

COMPARATIVE EXAMPLES 4-22
Complexes 4-11 and 13-22 are prepared in similar fashion as complexes 1-3 except that CH$_2$-bridged, complex 8 is prepared as in U.S. Pat. No. 7,196,147 (see column 6). Complex 12 is commercially available from Sigma-Aldrich, Inc. Each complex is supported and used in a slurry polymerization in similar fashion as in Example 1. The results are reported in Table 1.
4
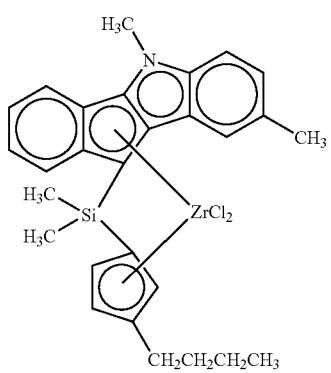
5
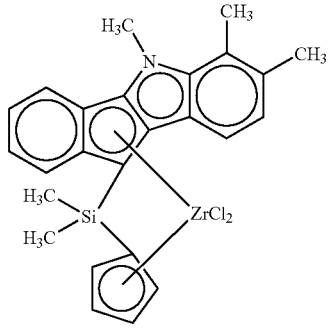
6
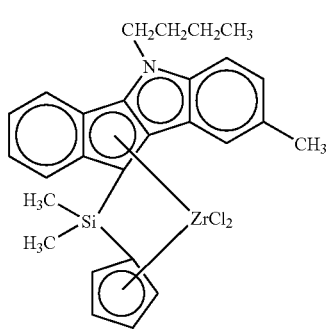
7
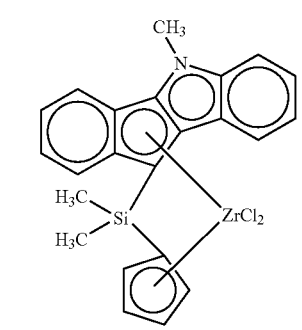
8
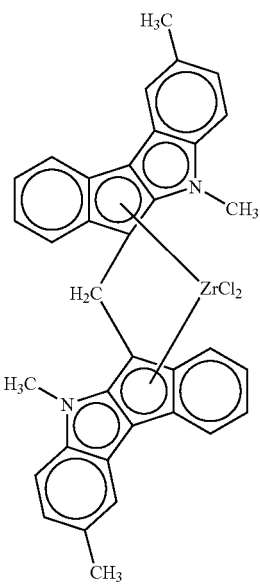
9
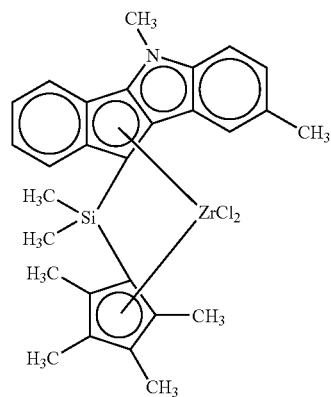
10
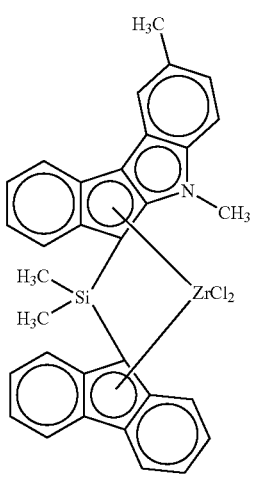

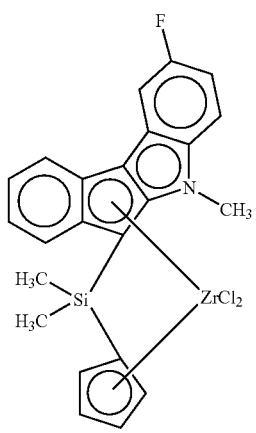
11
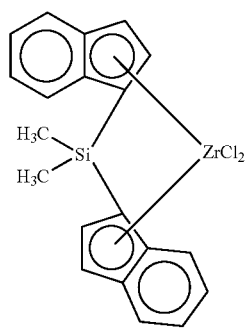
12
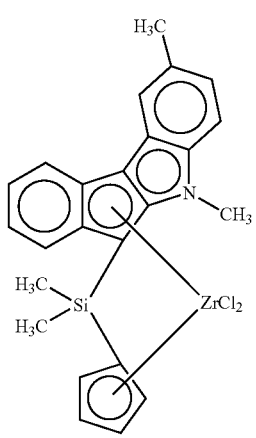
13
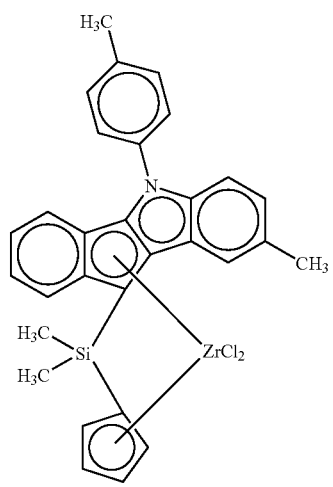
14
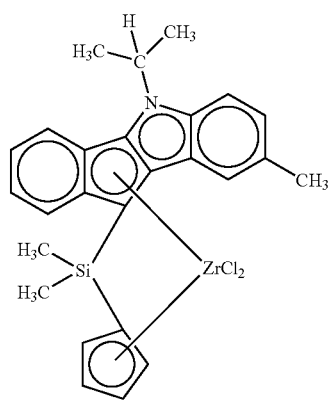
15
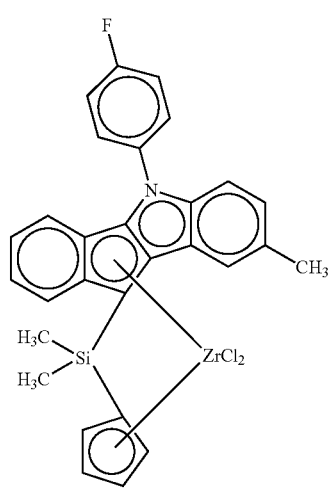
16

-continued
17
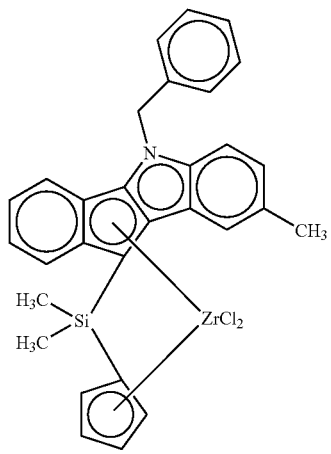
18
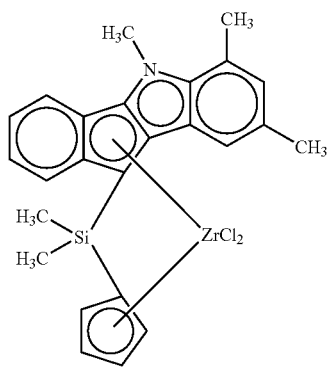
19
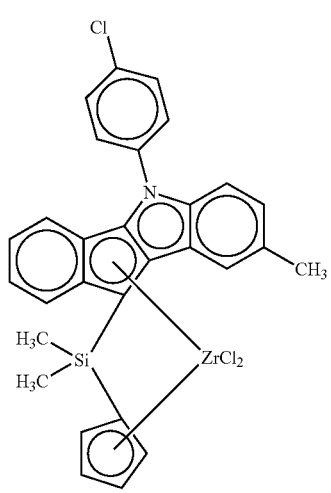
-continued
20
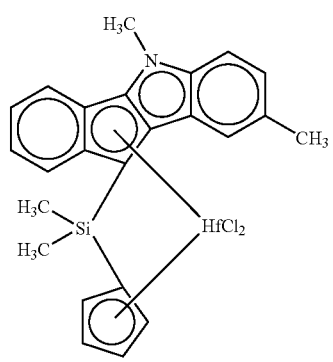
21
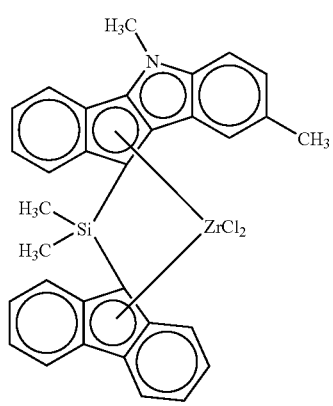
22
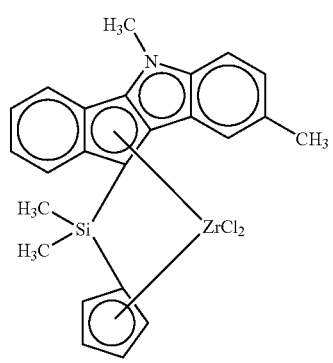
TABLE 1
Polymerizations
| Example | $M_w/M_n$ | Activity Ratio | $M_w$ | $M_w$ reduction with $H_2$ | Tertiary C/ 1000 C. |
|---|---|---|---|---|---|
| 1 | 14.9 | 9.5 | 149,000 | 86% | 5.5 |
| 2 | 15.4 | 8.0 | 116,000 | 64% | 8.4 |
| 3 | 18.1 | 5.4 | 223,000 | 68% | 4.3 |
| C4 | 5.7 | 4.2 | 68,000 | 75% | 5.9 |
| C5 | 3.4 | 1.9 | 51,000 | 90% | 6.8 |
| C6 | 3.0 | 1.3 | 53,000 | 86% | 7.9 |
| C7 | 3.3 | 1.6 | 58,000 | 89% | 5.2 |
| C8 | 3.2 | 4.1 | 205,000 | 52% | 18.2 |
| C9 | 10.3 | 2.3 | 86,000 | 77% | 4.3 |
| C10 | 9.5 | 0.94 | 325,000 | 6% | 5.2 |
| C11 | 2.6 | 5.3 | 37,000 | 83% | 9.2 |
| C12 | 3.3 | 6.0 | 78,000 | 66% | 18.2 |
| C13 | 2.6 | 4.1 | 35,000 | 81% | 7.2 |
| C14 | 6.4 | 1.8 | 181,000 | 64% | 6.2 |
| C15 | 4.7 | 1.9 | 46,000 | 86% | 5.4 |

TABLE 1-continued

| | | Polymerizations | | | |
|---|---|---|---|---|---|
| Example | $M_w/M_n$ | Activity Ratio | $M_w$ | $M_w$ reduction with $H_2$ | Tertiary C/ 1000 C. |
| C16 | 3.9 | 0.88 | 55,000 | 90% | 5.8 |
| C17 | 3.9 | 2.5 | 58,000 | 85% | 5.3 |
| C18 | 3.4 | 1.9 | 51,000 | 94% | 6.8 |
| C19 | 3.3 | 3.3 | 54,000 | 89% | 5.9 |
| C20 | 16.1 | 0.10 | 222,000 | 39% | 9.5 |
| C21 | 13.5 | 0.51 | 454,000 | 43% | 3.6 |
| C22 | 10.3 | 2.3 | 86,000 | 90% | 4.3 |

As can be seen from Table 1, the claimed slurry process (Examples 1-3) produces polyethylene with a broad molecular weight distribution as indicated by a $M_w/M_n$ greater than 12. Examples 1-3 have high activity as demonstrated by activity ratios of greater than 4. Comparative Examples 4-22 demonstrate that this balance of high activity and broad molecular weight distribution is unexpected. Very similar complexes fail to provide the desired combination of attributes.

The preceding examples are meant only as illustrations. The following claims define the invention.

We claim:

1. A slurry process which comprises polymerizing ethylene at a temperature within the range of about 40° C. to about 90° C. in the presence of a $C_3$-$C_{10}$ α-olefin, hydrogen, and a catalyst comprising an activator and a supported, dimethylsilyl-bridged bis(indeno-indolyl)zirconium complex to produce polyethylene with broad molecular weight distribution as indicated by a $M_w/M_n$ greater than 12, wherein the catalyst has an activity ratio as defined herein greater than 4.

2. The process of claim 1 wherein the complex has the structure:

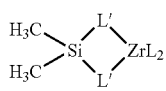

wherein each L' is an indenoindolyl ligand and each L is independently selected from the group consisting of halide, alkoxy, aryloxy, siloxy, alkylamino, and $C_1$-$C_{30}$ hydrocarbyl.

3. The process of claim 1 wherein the complex has a structure selected from the group consisting of:

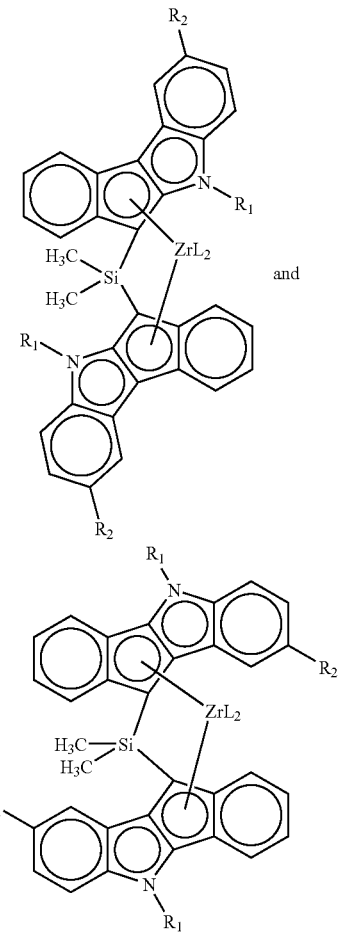

wherein each $R_1$ is independently selected from the group consisting of $C_1$-$C_{10}$ hydrocarbyl; each $R_2$ is independently selected from the group consisting of H, F, and $C_1$-$C_{10}$ hydrocarbyl; and each L is independently selected from the group consisting of halide, alkoxy, aryloxy, siloxy, alkylamino, and $C_1$-$C_{30}$ hydrocarbyl.

4. The process of claim 1 wherein the $C_3$-$C_{10}$ α-olefin is selected from the group consisting of 1-butene, 1-hexene, and 1-octene.

5. The process of claim 1 capable of forming polyethylene having a weight-average molecular weight greater than 100,000.

6. The process of claim 1 wherein 63 mmoles of 1-butene per mole of ethylene in the liquid phase forms polyethylene with greater than 5 tertiary carbons per 1000 carbons.

7. The process of claim 1 wherein introduction of 0.82 mmoles of hydrogen per mole of ethylene into the liquid phase reduces the weight-average molecular weight by at least 60%.

8. The process of claim 1 wherein the supported complex is supported on silica.

9. The process of claim 1 wherein the activator is selected from the group consisting of alumoxanes, alkylaluminum compounds, organoboranes, ionic borates, ionic aluminates, aluminoboronates, and combinations thereof.

10. The process of claim 9 wherein the activator is methylalumoxane.

11. The process of claim 3 wherein the complex has the structure:

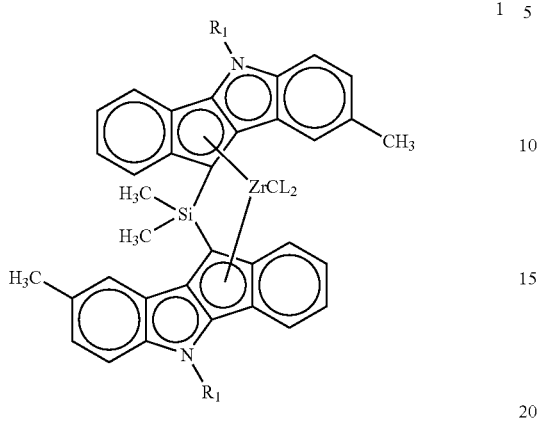

wherein each $R_1$ is independently selected from the group consisting of $C_1$-$C_{10}$ hydrocarbyl; and each L is independently selected from the group consisting of halide, alkoxy, aryloxy, siloxy, alkylamino, and $C_1$-$C_{30}$ hydrocarbyl.

12. The process of claim 11 wherein each $R_1$ is methyl.

13. The process of claim 11 wherein each $R_1$ is phenyl.

14. The process of claim 3 wherein the complex has the structure:

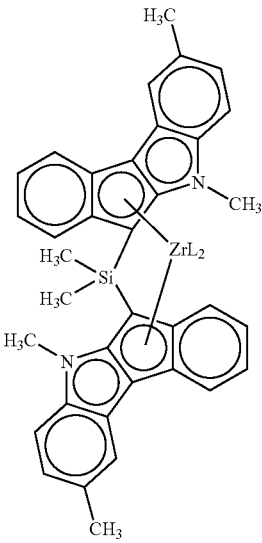

wherein each L is independently selected from the group consisting of halide, alkoxy, aryloxy, siloxy, alkylamino, and $C_1$-$C_{30}$ hydrocarbyl.

* * * * *